United States Patent [19]
Highsmith et al.

[11] Patent Number: 5,279,431
[45] Date of Patent: Jan. 18, 1994

[54] STORAGE RACK WITH IMPROVED BEAM-TO-CROSSBAR CONNECTIONS

[75] Inventors: Charles E. Highsmith; Dave Scottorn, both of Springfield, Tenn.

[73] Assignee: UNR Industries, Inc., Chicago, Ill.

[21] Appl. No.: 987,665

[22] Filed: Dec. 9, 1992

[51] Int. Cl.⁵ .............................................. A47F 5/00
[52] U.S. Cl. ..................................... 211/189; 211/187
[58] Field of Search ............... 211/189, 187, 190, 191, 211/182; 108/111

[56] References Cited

U.S. PATENT DOCUMENTS

| | | | |
|---|---|---|---|
| 3,285,428 | 11/1966 | Scheck | 211/187 X |
| 4,078,664 | 3/1978 | McConnell | 211/187 X |
| 4,101,233 | 7/1978 | McConnell | 211/187 X |

OTHER PUBLICATIONS

Unarco Material Handling, Brochure entitled "Sturdi--Bilt Rack", 1990, front cover and p. 7.
Unarco Material Handling, Price Book, Apr. 1, 1991, pp. 40 and 41.

Primary Examiner—Alvin C. Chin-Shue
Assistant Examiner—Sarah A. Lechok
Attorney, Agent, or Firm—Dressler, Goldsmith, Shore & Milnamow, Ltd.

[57] ABSTRACT

In a storage rack comprising a front beam, a back beam, and a crossbar extending therebetween, the front beam having a vertical wall facing backwardly and a horizontal ledge extending backwardly, the back beam having a recess wall facing frontwardly and a recess ledge extending frontwardly, a first slot is provided in one such wall and a second slot is provided in the other wall. The crossbar has a first tang extending from a first end and adapted to be initially inserted into the first slot and a second tang extending from a second end and adapted to be subsequently inserted into the second slot without removing the first tang from the first slot. Each end can sit firmly on a beam ledge with the tangs extending into the slots. The tangs have notches providing clearance for slot margins and end tabs preventing the tangs from being pulled out.

11 Claims, 2 Drawing Sheets

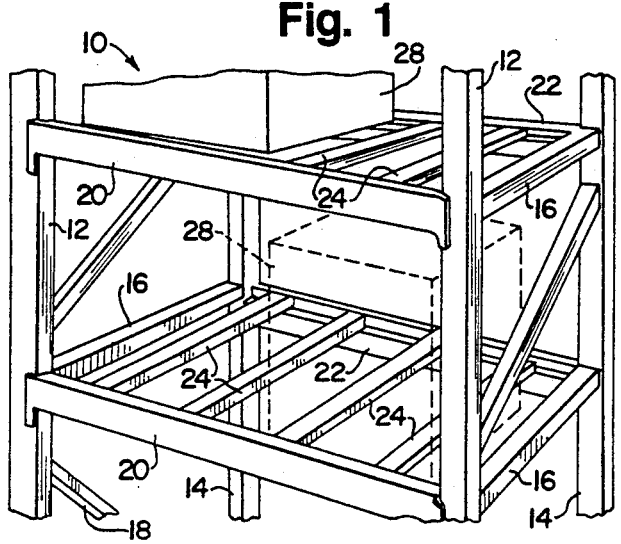
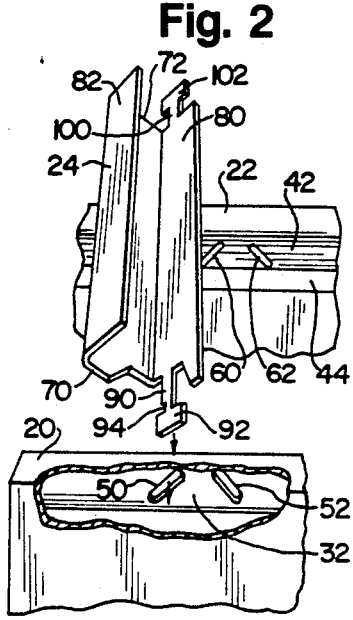
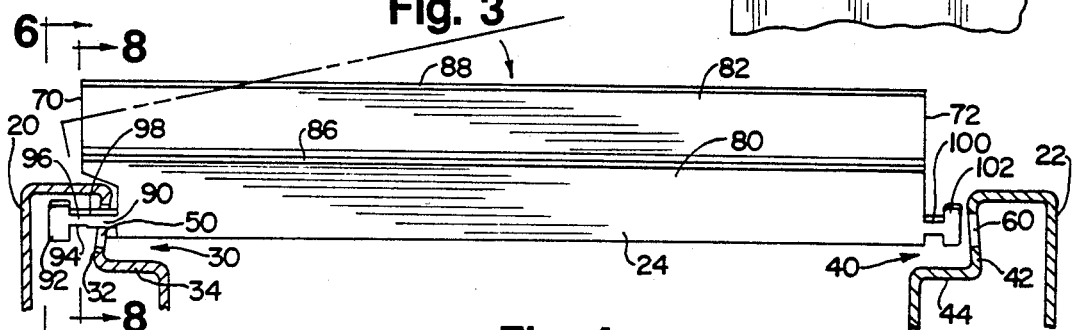
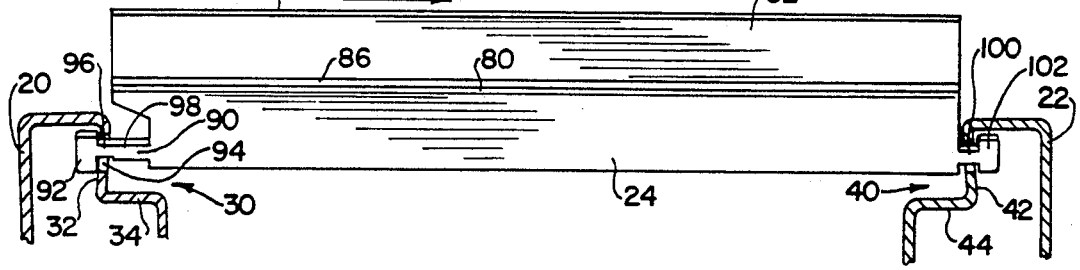
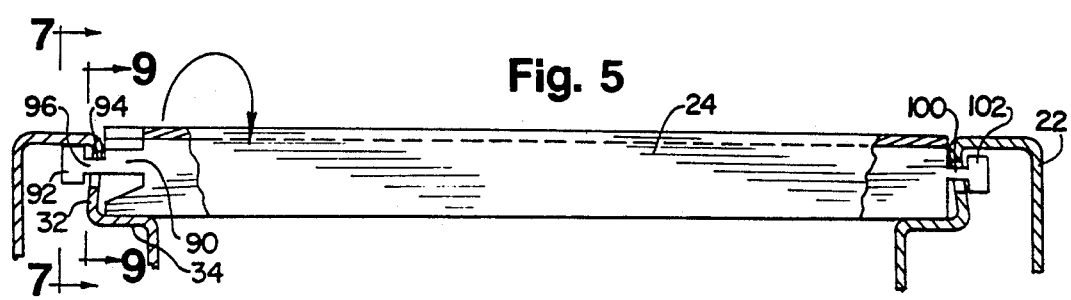

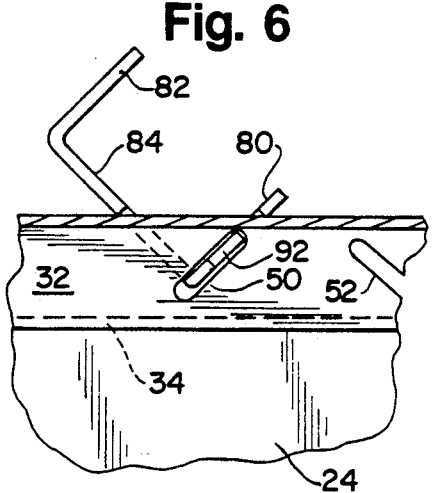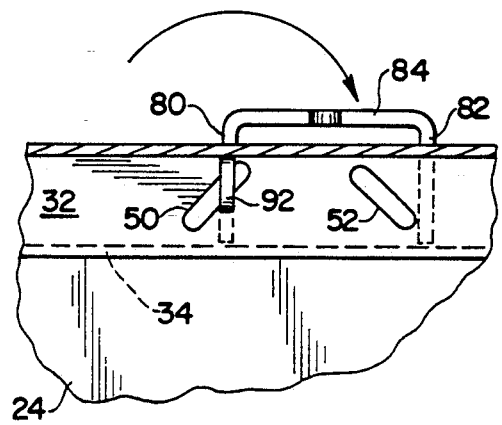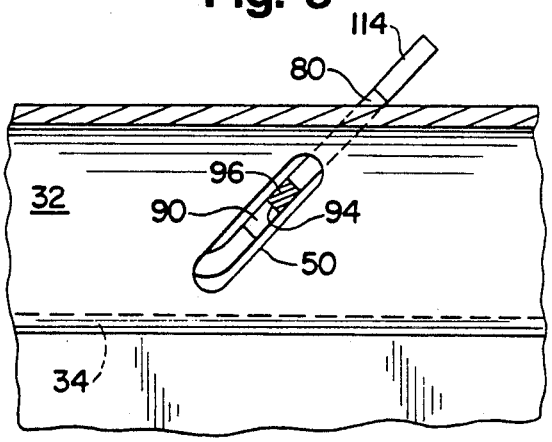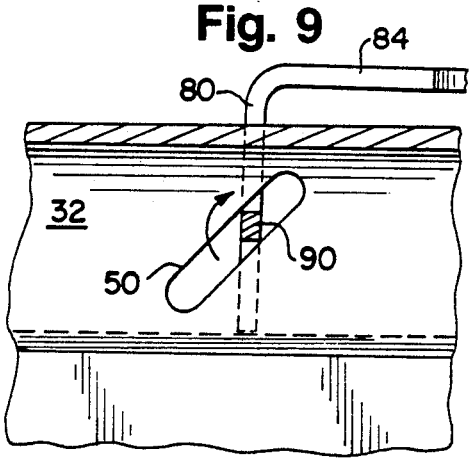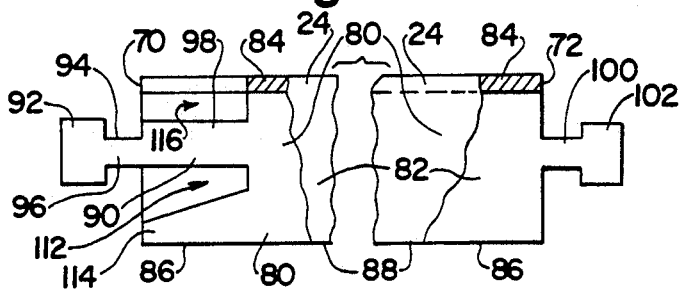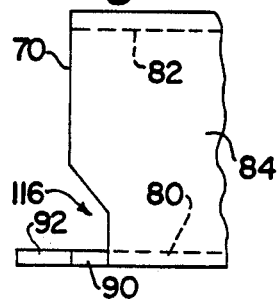

STORAGE RACK WITH IMPROVED BEAM-TO-CROSSBAR CONNECTIONS

TECHNICAL FIELD OF THE INVENTION

This invention pertains to a storage rack of a type comprising a front beam, a back bean, and a crossbar extending between the front and back beams. This invention provides improved beam-to-crossbar connections in the storage rack.

BACKGROUND OF THE INVENTION

A storage rack of the type noted above is useful for storing pallets. Typically, the storage rack has a rigid framework of upright columns and other members, which define multiple tiers and multiple bays on each tier. Each bay has two similar beams, namely a front beam and a back beam, which are designed to support a load, such as a pallet. Each bay may have one or more crossbars extending between the front and back beams. The crossbars are used to prevent misplaced or undersized pallets from falling between the front and back beams, to support broken pallets, and to support other loads, such as boxes.

Commonly, each beam is cold-rolled from a steel strip into a tubular shape, which is welded along a continuous seam. The welded shape is reshaped so as to have a recess defined by a generally vertical wall and by a generally horizontal ledge extending from a lower edge of the generally vertical wall. If such beam is used as a front beam, such wall faces backwardly, and such ledge extends backwardly. If such beam is used as a back beam, such wall faces frontwardly, and such ledge extends frontwardly.

The crossbars have end portions adapted to be firmly seated in the recesses of the front and back beams. The crossbars may be further mounted by flanges formed on the crossbars, fitted over upper portions of the beams, and secured by separate fasteners or by tabs formed on the crossbars and snapped into slots in the generally horizontal ledges. One disadvantage of such flanges is a need for separate fasteners to secure the crossbars against lateral movement along the beams. One disadvantage of such tabs and such slots, particularly but not exclusively for storage racks used in facilities for storing foods, is that food debris or other debris tends to enter the beams via such slots and cannot be easily removed from the beams.

SUMMARY OF THE INVENTION

This invention provides a storage rack of the type noted above with improved beam-to-crossbar connections. The storage rack comprises a front beam, a back beam spaced from the front beam, and a crossbar. The front beam has a recess defined by a wall facing backwardly and by a ledge extending backwardly from a lower edge of the backwardly facing wall. The back beam has a recess defined by a wall facing frontwardly and by a ledge extending frontwardly from a lower edge of the frontwardly facing wall.

According to this invention, the recess walls have slots including a first slot in the recess wall of one such beam and a second slot in the recess wall of the other beam. The crossbar has a first end and a second end spaced from the first end so as to permit the crossbar to extend between the recess walls of the front and back beams. The crossbar has a first tang extending from the first end, through the first slot, and a second tang extending from the second end, through the second slot.

Desirably, the slots are inclined, the first slot defining a mirror image of the second slot. Desirably, moreover, the crossbar is rotatable with the first tang extending into the first slot and with the second tang extending into the second slot in such manner that each end of the crossbar can be firmly seated in a respective one of the recesses.

Furthermore, the slots may include a third slot in the recess wall having the first slot and a fourth slot in the recess wall having the second slot, the first and third slots defining a mirror image of the second and fourth slots. Preferably, the first and third slots are inclined so as to converge upwardly, the second and fourth slots being inclined similarly.

Preferably, the crossbar defines an elongate channel, which has a base with two opposite edges and which has two flanges. Each flange depends from a respective one of the base edges. The first and second tangs extend lengthwise from the same one of the flanges at the first and second crossbar ends respectively. The flanges are adapted to bear against the ledges with the first tang extending at least partly into the first slot and with the second tang extending at least partly into the second slot.

Desirably, the tangs have end tabs adapted to prevent the tangs from being pulled from the slots when the crossbar is disposed so that the flanges bear against the ledges, as mentioned above. Desirably, moreover, the first tang has a notch providing clearance between the first tang and the recess wall at margins of the first slot when the crossbar is rotated.

Preferably, the crossbar is cut-away at the first end to provide clearance enabling the first tang to be initially inserted into the first slot without causing the second tang to interfere with the beam having the second slot in its recess wall. Preferably, moreover, the crossbar defines an elongate channel cut-away at the first end. The channel may have a base and two flanges and may be cut-away at the base and at one of the flanges.

Advantageously, the crossbar is secured to the front and back beams without a need for separate fasteners, and without the disadvantages of tabs formed on the crossbars and snapped into slots in the recess ledges. Debris does not tend to enter slots in the generally vertical walls as readily as it tends to enter slots in the generally horizontal ledges.

These and other objects, features, and advantages of this invention are evident from the following description of a preferred embodiment of this invention with reference to the accompanying drawings.

BRIEF DESCRIPTION OF THE DRAWINGS

FIG. 1 is a fragmentary, perspective view of a storage rack embodying this invention and comprising front beams, back beams, and crossbars, along with other structural members.

FIGS. 2 through 5 are larger, fragmentary, partly sectioned views taken from different vantages to illustrate sequential stages in assembling a crossbar to a front beam and to a back beam in the storage rack of FIG. 1.

FIGS. 6 and 7 are enlarged, fragmentary, sectional views. FIG. 6 is taken along line 6—6 of FIG. 3, in a direction indicated by arrows. FIG. 7 is taken along line 7—7 of FIG. 5, in a direction indicated by arrows.

FIGS. 8 and 9 are further enlarged, fragmentary, sectional views. FIG. 8 is taken along line 8—8 of FIG.

3, in a direction indicated by arrows. FIG. 9 is taken along line 9—9 of FIG. 5, in a direction indicated by arrows.

FIG. 10, on the scale of FIG. 6, is a fragmentary, elevational view of the crossbar of FIGS. 2 through 5.

FIG. 11, on the same scale, is a fragmentary, plan view of the same crossbar.

DETAILED DESCRIPTION OF PREFERRED EMBODIMENT

As shown fragmentarily in FIG. 1, a storage rack 10 constitutes a preferred embodiment of this invention. The storage rack 10 is shown as having multiple tiers with one bay in each tier. This invention contemplates that the storage rack 10 may have multiple bays in each tier.

Generally, the storage rack 10 comprises front columns 12, back columns 14, horizontal braces 16 extending between the front and back columns 12, 14, and diagonal braces 18 extending therebetween. At each bay in each tier, the storage rack 10 comprises a front beam 20 extending between the front columns 12, a back beam 22 extending between the back columns 14, and multiple crossbars 24 extending between the front and back beams 20, 22. The front and back beans 20, 22, are designed to support a load, such as a pallet having its stringers laid across the front and back beams 20, 22, or such as a box 28, as shown in FIG. 1. The crossbars 24 are used to prevent misplaced or undersized pallets from falling between the front and back beams 20, 22, to support broken pallets, and to support other loads, such as boxes.

The front and back columns 12, 14, the horizontal and diagonal braces 16, 18, and the front and back beams 20, 22, are connected in any suitable manner known heretofore. See, e.g., U.S. Pat. Nos. 4,712,696 and 4,741,445. According to this invention, improved connections are provided between the crossbars 24 and the front and back beams 20, 22.

Each beam 20, 22, is cold-rolled from a steel strip into a tubular shape, which is generally welded along a continuous seam. The tubular, welded shape is reshaped so as to have a recess defined by a generally vertical wall and by a generally horizontal ledge extending from a lower edge of the generally vertical wall. Thus, each front beam 20 has such a recess 30, which is defined by a generally vertical wall 32 facing backwardly and by a generally horizontal ledge 34 extending backwardly from a lower edge 36 of the recess wall 32. Also, each back beam 22 has such a recess 40, which is defined by a generally vertical wall 42 facing frontwardly and by a generally horizontal ledge 44 extending frontwardly from a lower edge of the recess wall 42. As shown, the recess walls 32, 42, are not truly vertical but extend downwardly and inwardly at a slight angle, preferably at an angle of approximately 5° to 7° from a vertical plane. In cross-section, therefore, each of the front and back beams 20, 22, is similar to known beams used heretofore in storage racks.

As described below, a representative combination of a front beam 20, a back beam 22, and a crossbar 24 is shown in FIGS. 2 through 9. The front and back beams 20, 22, are parallel to each other and are spaced by a fixed distance.

As shown in FIG. 2, the recess wall 32 of the front beam 20 has a pair of diagonal slots 50, 52, which are associated with the crossbar 24. The recess wall 42 of the back beam 22 has a pair diagonal slots 60, 62, which are associated with the same crossbar 24. The recess walls 32, 42, also have similar pairs of diagonal slots (not shown) which are associated with each respective one of the other crossbars 24 extending between the front and back beams 20, 22.

As shown in FIG. 2, the slots 50, 52, are inclined so as to converge upwardly, and the slots 60, 62, are inclined similarly. The front and back beams 20, 22, are disposed across from each other so that the slots 50, 52, define a mirror image of the slots 60, 62.

As shown in FIG. 2 and other views, the first slot 50 in the recess wall 32 of the front bean 20 is used to mount a first end 70 of the crossbar 24, and the slot 60 in the recess wall 42 of the back beam 22 is used to mount a second end 72 of the crossbar 24. However, if the ends 70, 72, of the associated crossbar 24 were reversed, the slot 52 in the recess wall 32 of the front beam 20 and the slot 62 in the recess wall 42 of the back beam 22 would be instead used. Thus, the front and the back beams 20, 22 are interchangeable.

Moreover, the crossbar 24 defines a generally U-shaped, normally inverted channel having two flanges 80, 82, and a base 84 between the flanges 80, 82. The flanges 80, 82, have lower edges 86, 88, respectively, which have equal lengths.

The crossbar 24 has a first, longer tang 90 extending lengthwise from the flange 80, at the first end 70 of the crossbar 24. The crossbar 24 has an end tab 92 extending from the first tang 90 and a notch 94 in the first tang 90 where the end tab 92 extends from the first tang 90. The notch 94 provides the first tang 90 with a portion 96 of reduced width. The end tab 92 extends beyond both lateral edges of the first tang 90 but is capable of passing through the slot 50 in the recess wall 32 of the front beam 20. At the notch 94, which is wider than the thickness of the recess wall 32, the portion 96 of the first tang 90 is not as wide as the slot 50 and is capable of rotating within the slot 50.

The crossbar 24 has a second, shorter tang 100 extending lengthwise from the flange 80, at the second end 72, along with an end tab 102 extending from the second tang 100. The end tab 102 extends beyond both lateral edges of the second tang 100 but is capable of passing through the slot 60 in the recess wall 42 of the back beam 42. Except for the end tab 102, the first tang 90 is not as wide as the slot 60 and is capable of rotating within the slot 60.

As shown in FIGS. 10 and 11, the base 84 and the flange 80 are cut-away near the first end 70 so as to define a portion 98 of the first tang 90, namely the portion 98 extending from the flange 80 to the notch 94, and so as to provide clearance for mounting the crossbar 24 in a manner to be next described. Thus, the flange 80 is cut-away below the first tang 90, so as to have a notch 112 between the first tang 90 and an intact portion 114 of the flange 80. It is important to note that the intact portion 114 is not shortened but that the lower edge 86 of the flange 80 remains of an equal length with the lower edge 88 of the flange 82. Also, the flange 80 and the base 84 are cut-away above the first tang 90, so as to have a notch 116 between the first tang 90 and an intact portion of the base 84. The intact portion remains of an equal length with the flange 82.

As shown in FIGS. 2 through 9, the crossbar 24 is mounted to the front and back beams 20, 22, in a specified manner. Thus, as shown in FIG. 2, the crossbar 24 is tilted so that its second end 72 is elevated slightly above the back beam 22. Also, the crossbar 24 is inverted so that the flanges 80, 82, extend upwardly but are inclined to one side so that the end tab 92 on the first tang 90 is aligned with the first slot 50 in the recess wall 32 of the front beam 20.

As tilted and inverted, the crossbar 24 is moved frontwardly so as to insert the first tang 90 into the slot 50, beyond the notch 94, so that the end tab 92 passes through the slot 50. Clearance enabling the first tang 90 to be so inserted without causing the second tang 100 to interfere with the back beam 22 is provided where the base 84 and the flange 80 are cutaway.

Next, the second end 72 of the crossbar 24 is lowered so as to be generally level with the first end 70 thereof. See FIG. 3. After the second end 72 has been lowered, and without rotating the crossbar 24, the crossbar 24 is moved backwardly so as to insert the second tang 100 into the slot 60 in the recess wall 42 of the back bean 22. See FIG. 4. Thus, the first tang 90 is withdrawn partly from the slot 50, until the notch 94 spans the recess wall 32 at the first slot 50.

Thereupon, the crossbar 24 is rotated until the flanges 80, 82, bear against the recess ledges 34, 44, of the front and back beams 20, 22. See FIG. 5. Thus, unless the crossbar 24 is rotated again to its tilted, inverted position, the end tab 92 prevents the first tang 90 from being pulled backwardly through the first slot 50. See FIG. 7. Also, the end tab 102 prevents the second tang 100 from being pulled frontwardly through the slot 60.

Although it is preferable to mount the crossbar 24 with the first tang 90 extending into the first slot 50 in the recess wall 32 of the front beam 20 and with the second tang 100 extending into the second slot 60 in the recess wall 42 of the back beam 22, the crossbar 24 can be similarly mounted with the first tang 90 extending into the other slot 62 in the recess wall 42 of the back bean 22 and with the second tang 100 extending into the other slot 52 in the recess wall 32 of the front beam 20.

Various modifications may be made in the preferred embodiment described above without departing from the scope and spirit of this invention.

We claim:

1. A storage rack comprising a front beam, a back bean parallel to the front bean and spaced from the front beam, and a crossbar, the front beam having a recess defined by a recess wall facing backwardly and by a recess ledge extending backwardly from a lower edge of the backwardly facing wall, the back beam having a recess defined by a recess wall facing frontwardly and by a recess ledge extending frontwardly from a lower edge of the frontwardly facing wall, the recess walls having slots including a first slot in the recess wall of one such beam and a second slot in the recess wall of the other beam, the crossbar having a first end and a second end spaced from the first end so as to permit the crossbar to extend between the recess walls of the front and back beams, the crossbar having a first tang extending from the first end, into the first slot, the crossbar having a second tang extending from the second end, into the second slot.

2. The storage rack of claim 1 wherein the crossbar is cut-away at the first end to provide clearance enabling the first tang to be initially inserted into the first slot without causing the second tang to interfere with the beam having the second slot in its recess wall.

3. The storage rack of claim 2 wherein the slots are inclined, the first slot defining a mirror image of the second slot, the crossbar being rotatable with the first tang extending into the first slot and with the second tang extending into the second slot in such manner that each end of the crossbar can be firmly seated in a respective one of the recesses.

4. The storage rack of claim 3 wherein the slots include a third slot in the recess wall having the first slot and a fourth slot in the recess wall having the second slot, the first and third slots defining a mirror image of the second and fourth slots.

5. The storage rack of claim 4 wherein the first and third slots are inclined so as to converge upwardly and wherein the second and fourth slots are inclined similarly.

6. The storage rack of claim 2 wherein the crossbar defines a channel, which has an elongate base with two opposite edges and which has two elongate flanges, each depending from a respective one of the opposite edges, the first and second tangs extending lengthwise from the same one of the elongate flanges at the first and second ends respectively, the flanges being adapted to bear against the ledges with the first tang extending into the first slot and with the second tang extending into the second slot.

7. The storage rack of claim 6 wherein the tangs have end tabs adapted to prevent the tangs from being pulled from the slots when the crossbar is disposed so that the flanges bear against the ledges with the first tang extending into the first slot and with the second tang extending into the second slot.

8. The storage rack of claim 7 wherein the slots are oriented diagonally, the first slot defining a mirror image of the second slot, the crossbar being rotatable with the first tang extending at least partly into the first slot and with the second tang extending at least partly into the second slot in such manner that each end of the crossbar can be firmly seated in a respective one of the recesses.

9. The storage rack of claim 8 wherein the first tang has a notch providing clearance between the first tang and the recess wall at margins of the first slot when the crossbar is rotated.

10. The storage rack of claim 7 wherein the crossbar defines an elongate channel cut-away at the first end of the crossbar to define a portion of the first tang and to provide clearance enabling the first tang to be initially inserted into the first slot without causing the second tang to interfere with the bean having the second slot in its recess wall.

11. The storage rack of claim 9 wherein the channel has a base and two flanges and is cut-away at the base and at one of the flanges.

* * * * *

UNITED STATES PATENT AND TRADEMARK OFFICE
CERTIFICATE OF CORRECTION

PATENT NO.   :   5,279,431
DATED        :   Jan. 18, 1994
INVENTOR(S)  :   Charles E. Highsmith It is certified that error appears in the above-identified patent and that said Letters Patent is hereby corrected as shown below:

Column 5, line 44, "bean" in both instances should be --beam--.

Signed and Sealed this

Fifth Day of July, 1994

Attest:

BRUCE LEHMAN

*Attesting Officer*      *Commissioner of Patents and Trademarks*